United States Patent
Debar et al.

(10) Patent No.: US 7,891,002 B2
(45) Date of Patent: Feb. 15, 2011

(54) GENERIC METHOD FOR DETECTING ATTACK PROGRAMS HIDDEN IN DATA CHAINS

(75) Inventors: Herve Debar, Louvingny (FR); Dominique Assing, Paris (FR); Benjamin Morin, Caen (FR)

(73) Assignee: France Telecom SA, Paris (FR)

( * ) Notice: Subject to any disclaimer, the term of this patent is extended or adjusted under 35 U.S.C. 154(b) by 975 days.

(21) Appl. No.: 10/491,851

(22) PCT Filed: Sep. 20, 2002

(86) PCT No.: PCT/FR02/03217

§ 371 (c)(1), (2), (4) Date: Dec. 17, 2004

(87) PCT Pub. No.: WO03/032134

PCT Pub. Date: Apr. 17, 2003

(65) Prior Publication Data

US 2005/0091528 A1    Apr. 28, 2005

(30) Foreign Application Priority Data

Oct. 5, 2001    (FR) .................................. 01 13063

(51) Int. Cl.
G06F 12/14    (2006.01)
G06F 21/00    (2006.01)
G08B 23/00    (2006.01)
(52) U.S. Cl. ............................. 726/24; 726/22; 713/188
(58) Field of Classification Search .................... 380/37; 713/188; 726/22, 24
See application file for complete search history.

(56) References Cited

U.S. PATENT DOCUMENTS

| | | | | |
|---|---|---|---|---|
| 5,442,699 A | * | 8/1995 | Arnold et al. | 713/188 |
| 5,696,822 A | * | 12/1997 | Nachenberg | 726/24 |
| 5,765,030 A | * | 6/1998 | Nachenberg et al. | 714/33 |
| 5,964,889 A | * | 10/1999 | Nachenberg | 714/25 |
| 2003/0079158 A1 | * | 4/2003 | Tower et al. | 714/23 |

FOREIGN PATENT DOCUMENTS

WO    WO 03101037 A1 * 12/2003

OTHER PUBLICATIONS

Carey Nachenberg, Computer Virus-Coevolution, Jan. 1997.*
J. Erickson. Hacking: The Art of Exploitation. No Starch Press, 2003.*

* cited by examiner

*Primary Examiner* — Kambiz Zand
*Assistant Examiner* — Imhotep Durham
(74) *Attorney, Agent, or Firm* — Gerald E. Helget; Nelson R. Capes; Briggs and Morgan, P.A.

(57) ABSTRACT

This invention concerns a method for processing computer system input data including at least one detection step for a specific word INSTR present among said data.

In the method according to the invention, the specific word to be detected represents an instruction necessary for the execution of a program present among said data.

Because it focuses detection on the means necessary for the execution of an attack program that thus reveal the presence of said program, the invention can be used to simply and effectively detect different types of attacks.

7 Claims, 2 Drawing Sheets

GENERIC METHOD FOR DETECTING ATTACK PROGRAMS HIDDEN IN DATA CHAINS

CROSS-REFERENCE TO RELATED APPLICATIONS

The present application is a U.S. National Stage application under 35 U.S.C. 371 and claims priority of International patent application Serial No. PCT/FR02/03217, filed Sep. 20, 2002 and published in French as WO 03/032134 A1 on Apr. 17, 2003 and translated into English, the content of which is hereby incorporated by reference in its entirety.

BACKGROUND OF THE INVENTION

This invention concerns a method for processing input data in a computer system, including at least one step to detect a specific word present among said data.

These types of methods are commonly used to detect attack programs coming from outside the computer system aimed at disrupting the operation of the system by making it execute unauthorized actions developed by a system attacker. These attacks can therefore adversely affect the integrity, the availability and the confidentiality of a computer system. They cause considerable damage and affect both administrations and private enterprises, and therefore all of modern society. It is therefore desirable to equip computer systems with means allowing them to reliably and routinely detect such attacks.

The invention is related to the following considerations:

Most attacks identified take advantage of flaws present in the systems for which these attacks are intended. The most commonly observed attacks use a principle known as "buffer overflow." These attacks use a property of certain computer systems according to which, when the length of a flow of information intended for a memory zone with a pre-determined length exceeds said pre-determined length, the word or words that cannot then be stored in the memory zone due to a lack of available memory space and that therefore "exceed" said memory zone are considered by a central processing unit to be included in the system as immediately executable instructions, and are therefore executed without any verification of their legitimacy by the processing system. These types of instructions can also trigger a call to a program stored by the attacker either previously anywhere in the memory space or simultaneously in the memory zone that the attacker has chosen to cause to overflow.

In the current state of the art, two methods are used to detect attacks via buffer overflow.

A first detection method identifies very long data chains, since a large number of data is generally necessary to cause the targeted memory zone to overflow. This first method is not entirely satisfactory, and will be less and less effective as more and more complex computer tools appear, necessitating exchanges of data chains with ever increasing lengths during normal operation. It will thus be increasingly difficult to differentiate a long but inoffensive data chain from a pernicious data chain of comparable length.

A second detection method looks for data chains containing a large number of instructions of a type known in Assembler language under the term NOP, which are in themselves inoffensive, since they order the central unit to do nothing, but an accumulation of which can be used to cause the targeted memory zone to overflow. This second detection method, more precise than the first, is also destined to lose its effectiveness as new ways of encoding NOP instructions appear. In the current state of the art, fifty-three different ways of producing NOP instructions have been listed following analysis of known attacks. The number of combinations offered to disguise NOP instruction chains is therefore very large and exceeds the detection capabilities of most of the current data processing systems.

SUMMARY OF THE INVENTION

This invention aims to eliminate these disadvantages to a large extent by proposing a data processing method that allows generic detection of attack programs included in the input data chains of a computer system, said detection being accomplished independent of the length of said data chains and the of presence of NOP instructions in said chains.

Indeed, according to the invention, a data processing method that conforms to the introductory paragraph is characterized in that the specific word to be detected represents a necessary instruction for the execution of a program present in said data.

The inventors' work has shown that in order to be executed, any attack program must include one or more particular characters generated by instructions represented by specific words present in the input data. These specific instructions can thus betray the presence of an attack program in an apparently inoffensive data chain. A null character is an example of this type of particular character consisting of a null value word intended to signal the end of a chain of characters. The presence of a null character, as such, in a data chain including an attack program will be interpreted by the system receiving this data chain as an interruption of said chain and will prevent the execution of the attack program.

Thus, by designing a method that no longer looks for the means in an input data chain for causing the memory zone to overflow, but instead looks for the means necessary for the execution of the attack program hidden in said data chain and that thus reveal the presence of said program, the inventors have identified a new suspicion criteria. This detection principle can be used generically to detect attacks other than buffer overflow attacks.

As presented above, a null character as a punctuation sign signaling and end of a chain of characters and that must therefore be generated by an attack program, necessitates the presence of a special instruction to this effect, said instruction then being capable of betraying the presence of an attack program in an apparently inoffensive data chain. One way to generate this type of character is to produce an XOR instruction between identical binary values.

In a particular mode of implementation of the invention, the specific word to be detected will therefore represent an XOR instruction between the content of a register and the same content of said register.

The input data of a computer system can be presented in different formats. In particular, they can be encoded according to an ASCII-type format and thus be difficult to manipulate.

According to a variant of the invention, a method as described above also includes, prior to the detection step, a step to transcribe the input data into hexadecimal code.

Words, characters or instructions hidden in an input data chain will be easier to detect in hexadecimal format than in ASCII format.

The method according to the invention can be used either to perform preventive attack detection, that is, to signal to the central processing unit the presence of a suspicious word that potentially reveals the presence of an attack program hidden in an input data chain before said central processing unit processes the data chain, or to make a diagnosis after an attack, in which case it will be desirable to be able to analyze retrospectively the circumstances in which the attack occurred.

A method as described above will therefore advantageously contain a step for storing the input data in an input log prior to the detection step.

When a specific word has been detected and therefore a data chain including said specific word has been identified as being suspicious, this suspicion can be corroborated by the presence in said suspicious data chain of other instructions that are often used by attack programs, for example "skip," interruption" or "system call" instructions.

To this end, a method as described above also includes a search step in an area of the input log that includes an instruction detected during the detection step for instructions at least of the type known to be used by existing computer viruses.

As presented previously, in a buffer overflow attack a system attacker seeks to cause a memory zone whose pre-determined length it knows to overflow. While such memory zones exist in most computer systems, their number is limited and they are difficult to find, so attackers often seek to exploit flaws they already recognize, having already identified them and used them successfully in the past, and repeatedly use a same memory zone start address as attack target with different attack morphologies. The address thus used therefore often constitutes an attacker signature, which it may be advantageous to index for prevention and/or diagnostic purposes.

With this aim, a method like the one described above also includes a search step in an input log zone that includes an instruction detected during the detection step for at least one memory address value known to be used by existing computer viruses.

In one of its possible modes of implementation, the invention also concerns a software program capable of using a method as described above, which software program may be loaded from a data medium in a memory included in the computer system so that it can be executed by a central processing unit included in said system.

In one of its multiple marketing modes, the invention also concerns a data medium containing, in encoded form, a software program like the one described above. This type of data medium may, for example, consist of a tape or a magnetic disk, a magneto-optical disk, or even an optical CD or DVD disk.

In one of its modes of implementation, the invention concerns a data processing system includes:
  an input port intended to receive the system input data,
  a central processing unit,
  a memory, and
  means of detection capable of detecting at least one specific word present in the input said specific word being representative of an instruction necessary for the execution of a program present among said data and executable by the central processing unit.

In a particular embodiment of this type of system, the specific word to be detected is representative of an XOR instruction between the content of a register included in the memory and the same content of said register.

In one of its variants, this type of system also includes means for storing the system input data in an input log in order to analyze said data via the means of detection.

As presented earlier, a system according to this variant will advantageously contain search means intended to identify, for confirmation or diagnostic purposes, instructions of at least a type known to be used by existing computer viruses and/or at least one memory address value known to be used by existing computer viruses.

The features of the invention mentioned above along with others will appear more clearly upon reading the following description of a mode of embodiment, said description being given in relation to the appended drawings, which include:

DETAILED DESCRIPTION OF ILLUSTRATIVE EMBODIMENTS

Figure 1:
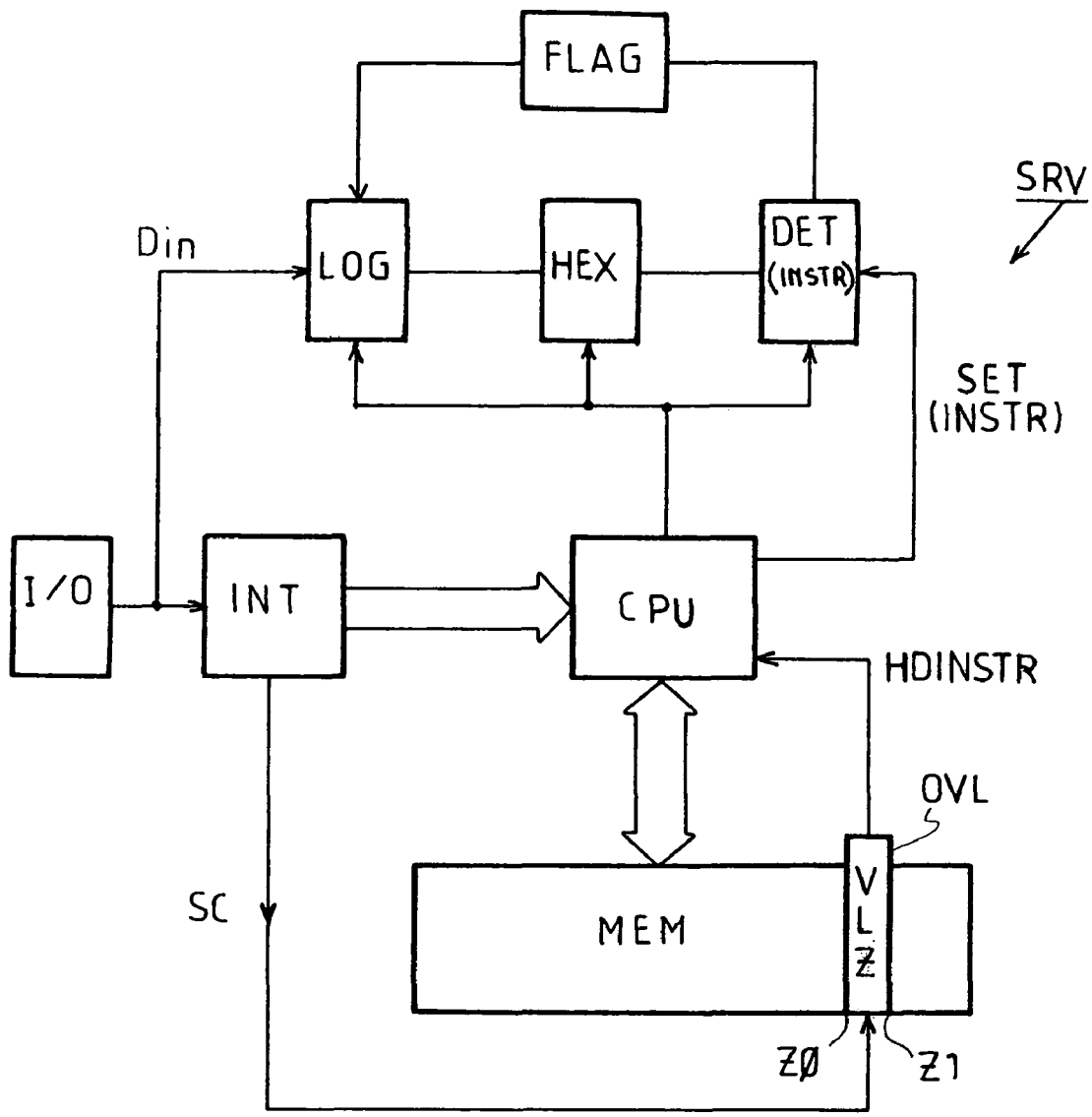
FIG. 1 is a functional diagram describing a data processing system according to a mode of implementation of the invention.

FIG. 1 represents a data processing system SRV, for example a server forming part of a telecommunications network, which system includes:
  an I/O input port designed to receive system SRV input data Din,
  a central processing unit or CPU, and
  a memory MEM.

These types of systems are vulnerable to attack programs, particularly buffer overflow attacks, that are generally hidden in input data chains Din. These data chains Din, which can, for example, be presented in ASCII format, are translated into Assembler language by an interface INT. When a buffer overflow attack program SC is present in an input data chain, this program seeks to backfill a vulnerable memory zone VLZ, for it has start and end addresses ZO and Zl that are pre-determined and known by an attacker who designed the attack program, by means of a data flow with a length that exceeds the length [ZO;Zl] of the vulnerable memory zone VLZ.

The first word or words that thus cannot be stored in the memory zone VLZ due to a lack of available memory space, shown here in the form of an overflow OVL, will be considered by the central processing unit CPU as an instruction HDINSTR that is executable immediately, and will therefore be executed without any verification of its legitimacy by the SRV system. This HDINSTR instruction can, for example, trigger a call to a program that may have been stored previously by the attacker anywhere in the memory space MEM or simultaneously in the memory zone VLZ that the attacker has chosen to cause to overflow.

In order to detect such attacks, the data processing system SRV shown here includes detection means DET(INSTR) capable of detecting at least one specific word present in the input data Din, said specific word being representative of an instruction necessary for the execution of a program present among said data Din and executable by the central processing unit CPU.

The nature of the instruction INSTR, of which the specific word to be detected is representative, is determined by the central processing unit CPU by means of a signal SET(INSTR) sent by said central unit CPU to the means of detection DET(INSTR). In effect, the means of detection DET(INSTR) included in this particular method of implementation of the invention are capable of detecting several different specific words.

The processing system SRV described here also includes means for storing the input data of the system in an input log LOG so that the means of detection DET can analyze said data. The input data Din are thus stored in the log LOG, under the control of the central unit CPU, which more particularly supplies said log LOG with time information in order to record said data Din in chronological order. As these data are, in principal, in ASCII format, the processing system SERV also comprises transcription means HEX, capable of translating, under the control of the central unit CPU, said data Din into a more easily intelligible format, like, for example, into hexadecimal binary code allowing easier identification of instructions in Assembler language.

Furthermore, this processing system SRV includes signaling means FLAG that make it possible to enter in the log LOG the results of detection operations performed by the detection means DET(INSTR). Thus, with each data chain Din will be associated information as to its content, and each data chain containing a specific word identified by the means of detection DET(INSTR) as potentially revealing the presence of an attack program will be signaled as such, which will facilitate subsequent diagnostic operations.

Figure 2:
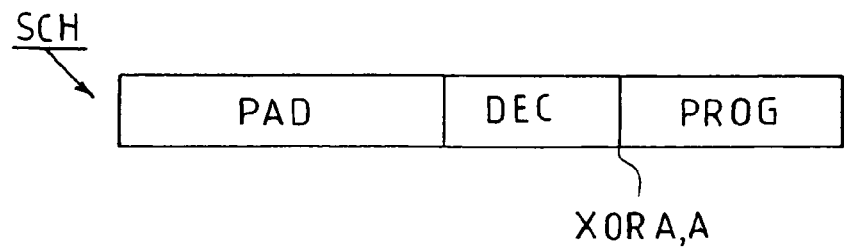
FIG. 2 is a diagram representing a portion of a data chain including an attack program.

FIG. 2 is a schematic representation of the structure that a buffer overflow program SCH present in an input data chain may have. This representation is the fruit of the work of the inventors and allows us to better understand the difference in principle that exists between the detection method developed by them and the known attack program detection methods. According to this representation, a buffer overflow attack program SCH includes a first part PAD, called backfilling, which most often contains a large number of NOP instructions that may have been encoded in different forms by the attacker in order to make them unrecognizable and therefore undetectable. The volume represented by this backfilling part PAD must be equal to the length of the vulnerable memory zone targeted by the program so that it fills this memory zone until it causes it to overflow. The attack program SCH contains a second part DEC, which is therefore intended to exceed the memory zone targeted by the attacker and will thus be considered to be an immediately executable program by the central processing unit of the system targeted. This immediately executable program can, itself, consist of a series of instructions intended to produce the attack's harmful effect or, in the case of a polymorph attack program, to constitute a decoder intended to decode a series of data present in a third part PROG of the attack program SCH, which third part contains, in encoded form, a series of instructions intended to produce the harmful effect and are intended to be decoded by the decoder included in the second part DEC. Thus encoding makes it more difficult to detect the attack program SCH using known detection methods. The third part PROG will also contain call and return addresses whose identification, made possible thanks to the invention, can prove useful for making diagnoses as to the nature of the attack and the identity of the attacker.

In any event, the second and third parts DEC and PROG of the attack program SCH must be separated from one another by at least one null character that signals the end of the program PROG. Now, this type of character, if it is apparent as such in the data chain Din that includes the attack program SCH, will be interpreted as an element of punctuation for a chain of characters and will interrupt the operation of the attack program SCH.

The inventors concluded that an attack program SCH must contain in lieu of this type of null character a specific word representative of an XOR A,A instruction that, by performing an XOR operation between the content of a register A and the same content of said register A, will produce a null value word when the attack program SCH is executed and will signal by this particular character the end of the chain of instructions contained in the second part DEC of said program SCH.

The invention aims to detect such particular characters, which are indicative of the presence of an attack program in an input data chain of a data processing system, regardless of the nature of the attack itself, while the known detection methods aim primarily to detect chains similar to the backfilling part PAD.

Figure 3:
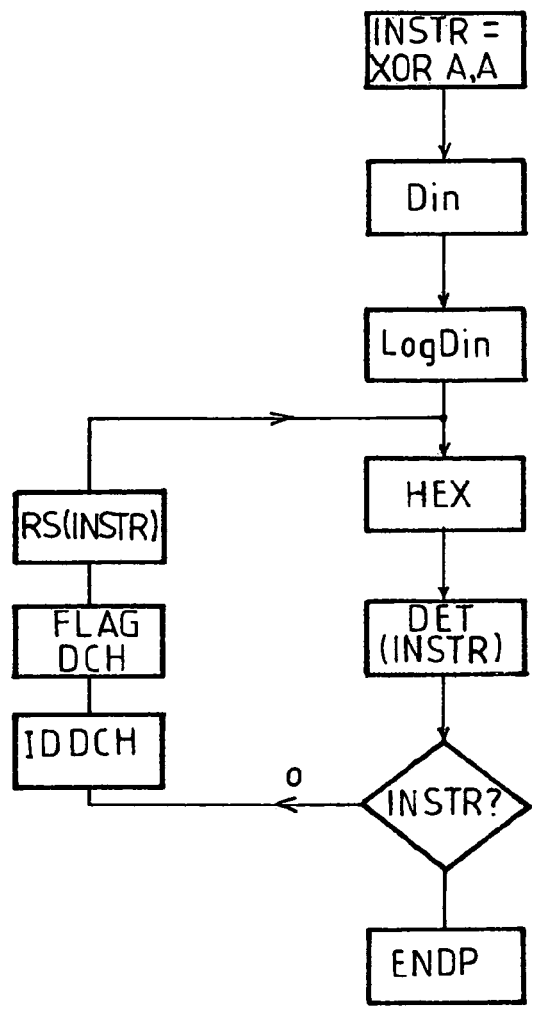
FIG. 3 is a flow chart describing a data processing method implemented in this type of system.

FIG. 3 illustrates in the form of a flow chart a possible mode of implementation in a data processing method intended to detect the presence of an attack program hidden in a data chain. In an initial step INSTR=XOR A,A of this method, the central processing unit informs the means of detection that the specific word to be detected must be representative of an XOR instruction between the content of a register A and the same content of said register A, to repeat the example used earlier. In a following step Din, an input data chain is received by the system via its input port. In a following step LogDin, these input data are stored in an input log. In a following step HEX, the data stored in said input log that can, for example, be in ASCII format, are transcribed into hexadecimal code. In a following step DET(INSTR), the data thus transcribed are reviewed by the means of detection, which look within these data for a specific word representative of the instruction INSTR, that is, at this stage, an XOR A,A instruction. If no instruction of this type is found, the method is completed and no special mention is made in the input log in correspondence with the input data chain Din.

If, on the other hand, the detection means detect among the input data Din a specific word representative of an XOR A,A instruction, a corresponding portion of the data chain DCH is identified during an IDDCH step and a mention indicating the presence of a suspicious instruction that potentially reveals the presence of an attack program is made during a FLAGDCH step in said log in correspondence with the DCH portion identified. In order to corroborate these suspicions, the central processing unit may change the nature of the instruction of which the specific word to be detected is representative during a following step RS(INSTR) in order to initiate a search in the input log zone that includes the portion of the data chain DCH previously identified for INSTR instructions of at least a type known to be used by existing computer viruses, for example "skip," "interruption" or "system call" instructions. Such searches are then conducted during the steps HEX and DET(INSTR) already described, the results of said searches, if they are positive, being in turn recorded in the input log during the IDDCH and FLAGDCH steps already described.

The central unit may also trigger a search for a memory address value known to be used by existing computer viruses by means of the RS (INSTR) step, instead of ordering the search for another instruction.

These types of addresses are of particular interest since they often constitute a kind of attacker signature and thus make it possible to accelerate the establishment of a diagnosis related to the harmful effects the designer intends the detected attack to cause, a diagnosis that will be made possible thanks to the invention through an examination of the input log.

The invention claimed is:

1. A method for processing input data of a computer system for detecting a polymorphic attack program, the method comprising;
   a first step of monitoring the input data to determine if said data contains a program having a decoder adapted to decode a series of encoded instructions, said series of encoded instructions being intended to produce a harmful effect when decoded and executed, and said program also having a specific word that corresponds to an instruction for generating a particular numerical value signaling the end of the decoder and being required to trigger the decoding of said series of encoded instructions by the decoder;

a second step of searching for said specific word in said input data and;

a third step of signaling the computer system of the presence of the polymorphic attack program in said input data to be flagged and analyzed by said computer system, when said specific word is detected.

2. A data processing method as claimed in claim 1, wherein said particular numerical value is a null value and wherein the specific word to be searched is representative of an XOR instruction between the content of a register and the same content of said register, said specific word producing the null value.

3. A data processing method as claimed in claim 1, wherein it also includes, prior to the detection step, a step for transcribing the input data into hexadecimal code.

4. A data processing method as claimed in claim 1, wherein it also includes, prior to the detection step, a step for storing input data in an input log.

5. A data processing method as claimed in claim 4, wherein it also includes a search step in a zone of the input log that includes an instruction detected during the detection step for instructions of at least a type known to be used by existing computer viruses.

6. A data processing method as claimed in claim 4, wherein it also includes a search step in a zone of the input log that includes an instruction detected during the detection step for at least one memory address value known to be used by existing computer viruses.

7. A non-transitory data medium containing in encoded form a software program capable of implementing a method conforming to claim 1.

* * * * *